March 20, 1956     C. H. PHILLIPS     2,739,009

CLAMPS WITH PRE-STRESSED AND PRE-SET FLEXIBLE GRAB ARMS

Filed Dec. 29, 1952     3 Sheets-Sheet 1

Inventor:
Clifton H. Phillips
By: Oswald H. Milmore
His Attorney

March 20, 1956 C. H. PHILLIPS 2,739,009
CLAMPS WITH PRE-STRESSED AND PRE-SET FLEXIBLE GRAB ARMS
Filed Dec. 29, 1952 3 Sheets-Sheet 2

Inventor:
Clifton H. Phillips
By: Oswald H. Wikmore
His Attorney

March 20, 1956     C. H. PHILLIPS     2,739,009
CLAMPS WITH PRE-STRESSED AND PRE-SET FLEXIBLE GRAB ARMS
Filed Dec. 29, 1952     3 Sheets-Sheet 3
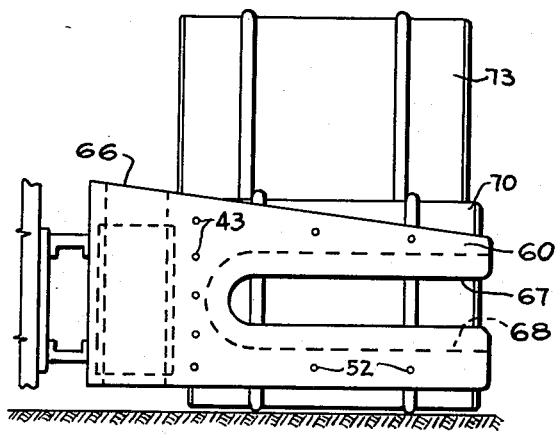
Fig. 11
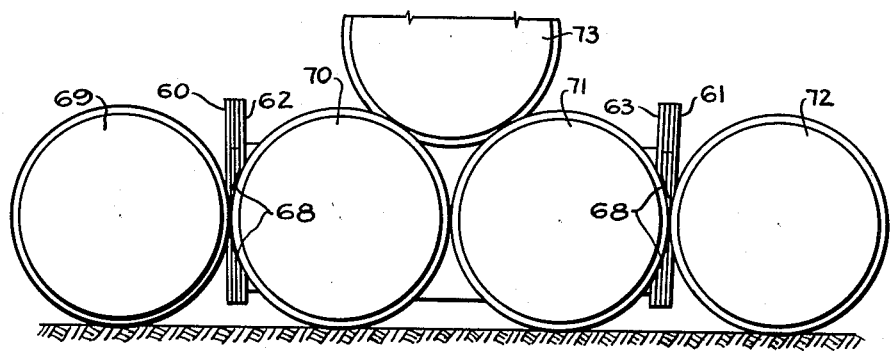
Fig. 12
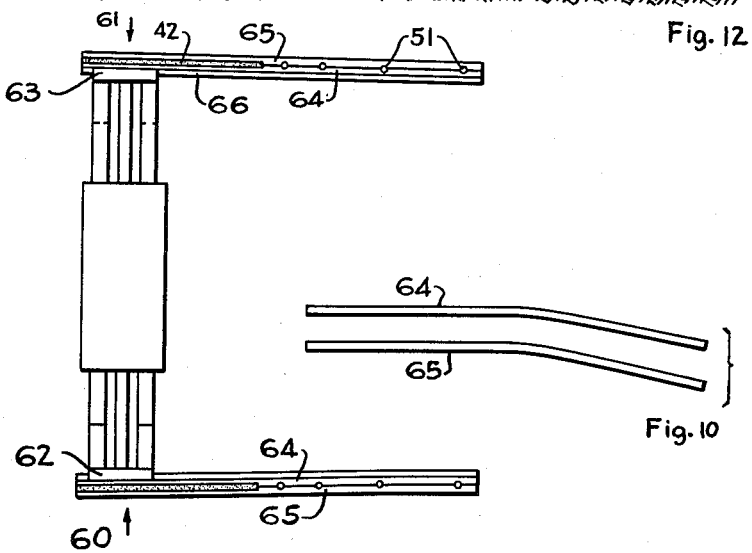
Fig. 10
Fig. 13
Inventor:
Clifton H. Phillips
By: Oswald H. Milmore
His Attorney

United States Patent Office 2,739,009
Patented Mar. 20, 1956

2,739,009

CLAMPS WITH PRE-STRESSED AND PRE-SET FLEXIBLE GRAB ARMS

Clifton H. Phillips, Demarest, N. J., assignor to Shell Development Company, Emeryville, Calif., a corporation of Delaware Application December 29, 1952, Serial No. 328,301

21 Claims. (Cl. 294—88)

This invention relates to clamps having a pair of grab arms that extend forwardly in spaced relation from a pair of supporting, relatively shiftable clamp brackets such as are used, for example, in industrial lift trucks having side-shifting clamps. More particularly, the invention relates to clamps having pre-stressed and pre-set arms adapted both for engaging the flat faces of flat-ended objects and for engaging the convex faces of convexly curved objects, specifically cylindrical drums or kegs that may or may not have rolling hoops. In a broader aspect, the invention relates to grab arms that are pre-set to converge at their forward parts and are more flexible at the front than at the rear.

This application is a continuation-in-part of application Serial No. 268,008, filed January 24, 1952, now abandoned.

For convenience the invention will be described with reference to specific embodiments applied to an industrial lift truck having side-shifting clamp brackets and grab arms that extend horizontally forwardly from the clamp brackets and have substantially vertical, opposed article-engaging faces. The choice of such an embodiment is, however, arbitrary and it should be understood that the improved grab arms and clamp may be used in other positions or inclinations and need not be used on industrial trucks with side-shifting clamps. It is, therefore, evident that such expressions as "horizontal" and "vertical" are used in the description and claims to indicate relative dispositions of parts of the clamp as shown on the appended drawing and are not restrictive of the directions of the parts of the clamp in actual use.

A drum, keg or the like is both a convexly curved object and a flat-ended object in that it has parallel, more or less flat ends. For brevity, in the following description, unless the contrary appears, reference to the clamping of a drum or the like is intended to refer to engagement by the grab arms of the convex surface of the drum and not to engagement of the ends of the drum.

It is often desired to employ the same clamp for handling flat-ended objects, such as boxes and cartons, and convexly curved objects, such as cylindrical drums or kegs. This dual use is not feasible with the usual rigid grab arms: on the one hand, when they have essentially parallel article-engaging faces suited for flat-ended objects they are not well suited for clamping the convex parts of drums because of the danger of forward slippage of the drums, e. g., due to forward inertia of the drum when the clamp is suddenly accelerated rearwardly (as when a forwardly moving lift truck on which the clamp is mounted is stopped suddenly) and due to the spreading of the front parts of the arms in relation to the rear parts incident to deflection caused by the clamping action. This further makes it impracticable to clamp more than one drum with the flat, parallel-sided clamps now used. On the other hand, when the article-engaging faces of rigid or relatively unflexible arms are shaped concavely to conform to the contour of the drum or the like or have toe-in or inwardly directed projections at their front ends to retain drums, they are not well suited to clamping objects having other shapes, particularly flat-ended objects, because the pressure is not applied evenly to the ends of such object; this is highly objectionable in the case of fragile containers, such as cartons. Such concavely shaped rigid grab arms, moreover, permit the drums to be picked up in only one predetermined position relative to the clamp (e. g., always upright or always on the side) and result in a construction of the arms that is thick, thereby restricting the use of the clamp to places where there is ample clearance between the object to be clamped and a nearby wall or other objects.

Outward deflection or spreading of the front parts of the grab arms in relation to the rear parts necessarily occurs when the arms are subjected to cantilever loading due to the clamping engagement with objects. This presents difficulties in the design of grab arms that will exert a suitably distributed, more or less uniform or even pressure against the faces of flat-sided objects at different distances out from the supporting clamp brackets, particularly when the clamp is to handle articles with end faces of different sizes and, further, articles of different weights and strengths that require different clamping pressures. Also, it has not heretofore been practicable to employ such grab arms for clamping simultaneously a plurality of separate articles situated at different points along the length of the arms. The prevailing tendency has been to construct heavy arms that are highly rigid and often have girder-like structures to minimize the outward deflection; such arms are sometimes associated with cushioning faces and/or article-engaging rocker arms to distribute the clamping force. Such heavy arms, however, are inherently thick in the direction perpendicular to the engaging face, making it impossible to insert the grab arm into such close places as the narrow clearances between boxes, drums or kegs, on the one hand, and the wall of a building, van or railroad car or other nearby boxes or drum, on the other. Difficulty has heretofore been encountered in reconciling such diverse requirements as strength adequate to clamp heavy loads and flexibility.

It is, therefore, an object of this invention to provide an improved grab arm for clamps wherein the arm is flexible and adapted both for clamping flat-ended objects and for clamping convexly curved objects without the danger of loss thereof by forward slippage. Ancillary thereto, it is an object to provide an improved grab arm that, in addition to being adapted to engage flat-ended objects, can engage and simultaneously support a plurality of convexly shaped objects with the rounded outlines thereof in engagement with the grab arms, e. g., two drums disposed along the length of the clamp, so that each drum is engaged by both arms but at different distances from the clamp slide or bracket, or arranged across the clamp, so that each of the drums is in engagement with only one arm, or four or more drums arranged in rows parallel to the arms, e. g., tessellated, i. e., arranged with the central axes at the corners of a square. Another ancillary object is to provide a grab arm that, in addition to being adapted to engage convexly shaped objects such as drums as indicated above, can engage and simultaneously support a plurality of flat-ended objects disposed along the length of the clamp.

A further object is to provide an improved clamp having grab arms that are of flexible construction and are pre-set to provide a toe-in at the front of the clamp, the convergence of the front parts of the arms being at least as great as that, if any, of the rear parts, the convergence being small enough and the arms being thin enough to enter close places. Ancillary thereto, it is an object to provide a clamp wherein the arms are curved inwardly at least at the forward parts, such curvature being advantageously greater than that of the rear parts of the arms (which may have zero curvature and may further be parallel); and to provide a clamp, the arms of which have greater lateral flexibilities at the front than at the rear.

Another object is to provide an improved grab arm for clamps having a laminated, flexible construction, said arm being pre-set to provide the desired toe-in and, if desired, curvature, and being pre-stressed so that the laminations are subjected to residual stresses when the arm is unloaded, whereby the front end of the arm is better adapted to maintain toe-in when an object is clamped at a point set back from the front end of the arm.

Still another object is to provide an improved method of fabricating a grab arm according to any of the foregoing objects.

In summary, the clamp according to one aspect of the invention comprises a pair of relatively movable, e. g., slidable, support brackets, each bracket having a prestressed and pre-set laminated grab arm extending forwardly therefrom, the pre-stressing being effected by fixing portions of the laminations together against relative longitudinal slippage while the several laminations are held in elastically bent positions and subjected to bending stresses in the same sense. The laminations are secured against relative longitudinal motion in such a way that the following conditions are met in the completed arm when no clamping stress is applied thereto: (1) The front parts of the laminations are individually under residual bending stresses in directions opposite to the stresses that are applied to the arms by the clamping load; preferably these residual bending stresses occur only at, or are greatest at, the front parts of the laminations; and (2) The outermost lamination of each arm (i. e., the lamination farthest away from the load-engaging surface of the arm) is longitudinally under residual compressive stress and the innermost lamination is longitudinally under residual tensile stress, with intermediate laminations, if any, at progressively intermediate stresses; these residual stresses are, of course, in the same sense as those that are caused by clamping a load. Further, the arms are pre-set to converge inwardly at the front. This convergence is preferably effected by starting with flat leaves and bending them elastically to converge the front ends for prestressing, whereby the front parts of the finished arms assume a permanent inward curvature; this curvature should preferably be greatest at the front and the rear parts of the arms, which are flat or only slightly curved, may then be disposed essentially parallel, i. e., truly parallel or converged slightly toward the front. However, as an alternative, the arms may be formed from leaves that are initially curved in directions opposite to the directions in which they are bent elastically for pre-stressing (i. e., diverging to the front) and bending the front parts elastically inwardly, whereby they are substantially flat after pre-stressing; in this case they are pre-set to provide toe-in by attaching them to the clamp brackets at the proper angle or by providing a buckle near the rear ends of the arms. Any desired number of laminations in excess of one may be used for each arm; for simplicity, only two such laminations are shown in the drawings, but a greater number, such as three or four, may be used.

In another aspect of the invention, the clamp comprises a pair of flexible arms of thin metal, mounted substantially vertically and pre-set to converge at the front as described above, wherein the front parts have greater lateral flexibilities than the rear parts. While this increased lateral flexibility at the front is attained by the use of a plurality of laminations secured together at points that are spaced apart farther at the front parts than at the rear parts, as described above, it may also be attained, according to this broader aspect of the invention, by making the arm of a single sheet of metal the cross sectional area and/or shape of which is different at the front and rear, e. g., by tapering the sheet in thickness or height, or by using different laminations that may be free to move longitudinally, as described in detail in patent application Serial No. 328,302, filed concurrently herewith. In any embodiment, the arms are shaped so that the moment of inertia of the section through the arm about a vertical axis of the arm is smaller at the front than at the rear. When the arms are connected together, as by welding, the moment of inertia of the composite arm is greater than the sum of the moments of inertia of the several laminations about vertical axes in their respective neutral planes. The term "flexibility" is used herein to denote the extent to which the arm can be bent elastically by a given bending moment and is inversely proportional to the moment of inertia of the arm about a vertical axis.

The method of constructing the grab arms includes the use of temporary tension clamps for bending the front ends of the laminations elastically toward each other, aided if desired by a temporary compression strut that is placed at an intermediate portion of the grab arm. When the laminated arms are thus elastically deformed parts thereof are secured together by welding along the margins of the laminations or by other connections, such as riveting or welding, at parts of the laminations intermediate to the margins, after which the clamps are removed. The arms may optionally be given a heat treatment, i. e., a low temperature stress relief annealing treatment, before removing the clamps.

The invention will be further described by reference to the accompanying drawings forming a part of this specification and showing certain preferred embodiments of the invention by way of illustration, wherein:

Figure 10 is a plan view showing the upper edges of a pair of leaves prior to pre-stressing suitable for making a grab arm according to a modification;

Figure 11 is a side elevation view of the completed grab arm made from the leaves shown in Figure 10 and employed to clamp a plurality of drums;

Figure 12 is a front elevation of the device shown in Figure 11; and

Figure 13 is a plan view of the clamp, the drums being omitted to show the unstressed shape of the arms.

Figure 1:
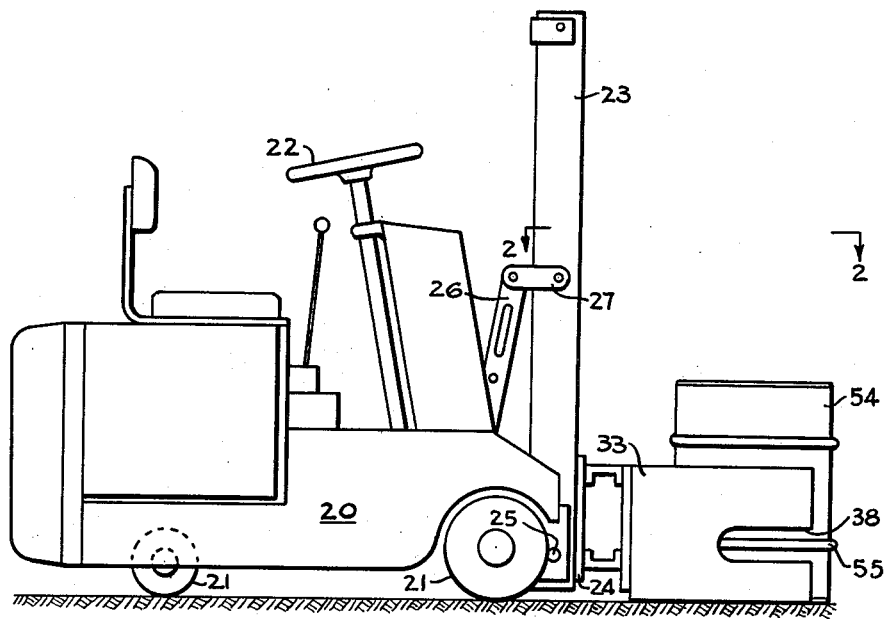
Figure 1 is a side elevation view of an industrial lift truck with a side-shifting clamp having a grab arm according to the invention used on a drum.

Referring to Figures 1–7 of the drawings in detail, the clamp is illustrated as applied to a conventional industrial truck 20 having wheels 21, a steering wheel 22 and the usual accessories, including (not shown) a hydraulic reservoir, pump and controls for actuating the elevator, tilting controller, clamps, etc. The truck carries vertical guide columns 23 and 23a which provide vertical tracks for an elevator 24 which is vertically movable on the trackways. The guide columns may be mounted for pivoted motion about a transverse pin 25 that is fixed to the truck chassis, tilting being effected by actuation of tilting levers 26 that are connected to the guide columns by pivoted links 27. The elevator 24 and levers 26 are actuated by suitable motors controlled from the truck, such as hydraulic motors; such motors and controls and the elevator being all well known in the art, they are not further described herein.

Figure 3:
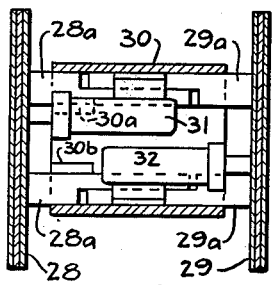
Figure 3 is a vertical section view taken on line 3—3 of Figure 2.
Figure 5:
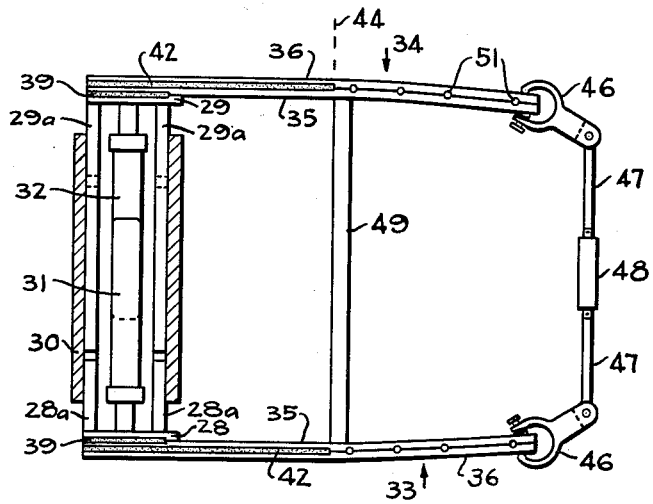
Figure 5 is an enlarged plan view of the clamp in the process of fabrication illustrating a method of making the same.

Two laterally movable, telescoping clamp slides or clamp brackets 28 and 29 are slidably mounted on the elevator by means of a stationary hollow support bracket 30 that is fixed to the latter. Each clamp bracket has four rectangular slide bars indicated at 28a and 29a, situated one at each interior corner of the bracket 30 for sliding engagement therewith along laterally extended parts thereof to resist relative rotation about a vertical axis such as would be induced by the spreading tendency of the grab arms, to be described, when an article is clamped. The ends of the slide bars may be rabbeted as shown in Figure 3 to increase their lengths, and the bars 28a may be given added vertical support by stationary bars 30a and 30b on the support bracket. The clamp brackets and slide bars are able to transmit to the support bracket cantilever stress about a horizontal, transverse axis, such as would result from the weight of the objects clamped. The clamp brackets are provided with a suitable clamp-actuating motor of any desired type, such as a pair of double-acting hydraulic cylinder-piston assemblies 31 and 32 as indicated in Figures 3 and 5, both cylinders being fixed to the support bracket 30 and the two pistons being connected to the clamp brackets 28 and 29, respectively. These cylinders are supplied through flexible hoses (not shown) with pressure fluid from a pump driven by the truck engine and controlled by the operator on the truck for translating the clamp brackets telescopically apart and together. The specific construction of the clamp brackets and their mounting on the elevator, as well as the actuating motor and control device thereof are all known and form no part of the invention; further description thereof is, therefore, unnecessary and the invention is not restricted to the specific arrangement illustrated.

Each clamp bracket carries a grab arm 33 or 34 that is rigidly secured to the lateral end of the bracket by any suitable means, such as welding or bolting. Each grab arm is assembled from a plurality of vertical leaves or laminations, such as steel plates 35 and 36 that may be made of resilient, spring stock and that are arranged as a transverse stack, and are pre-stressed and pre-set as described hereinafter. The several laminations may have essentially the same outlines, e. g., generally rectangular as shown in Figures 1-7, or trapezoidal as shown for the subsequent embodiment; the use of these outlines and congruency between the outlines of the several laminations is not, however, essential and the several laminations may, for example, have different lengths. The vertical dimensions of the laminations, at least at the rear where they are connected to the clamp brackets, are made sufficient to transmit vertical cantilever stress due to the weight of the clamped load without buckling despite the use of thin laminations; thus, rear vertical dimensions in excess of one-fourth of the length of the arms are preferred and dimensions substantially equal the arm length, as shown, may be used.

Figures 2, 4:
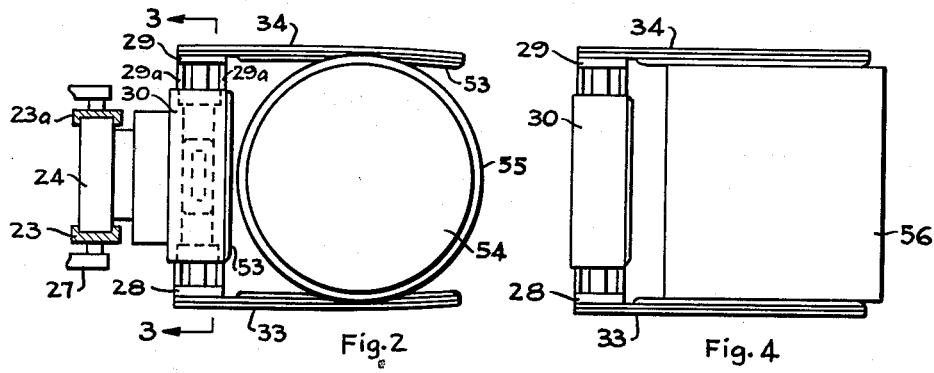
Figure 2 is a horizontal section taken on line 2—2 of Figure 1.
Figure 4 is a fragmentary plan view corresponding to a part of Figure 2 showing the clamp used on a box with parallel, flat ends.
Figure 8:
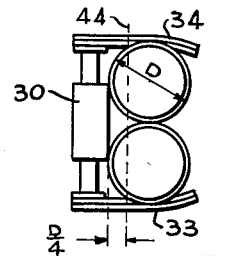
Figures 8 and 9 are schematic plan views showing two alternative designs suitable for different loads.
Figure 9:
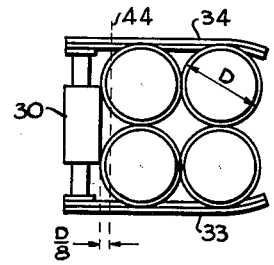

The contiguous plates 35 and 36 are shaped to provide in the composite arm a horizontal slot 38, open to the front and extending back a suitable distance in accordance with the intended use for the clamp, e. g., slightly in excess of one-half the length of the arm, as shown for loads as indicated in Figures 1, 2 and 8, or in excess of three-fourths of the length, as in Figures 10-13, for loads shown in these figures as well as loads shown in Figure 9. This slot serves the dual purpose of (1) facilitating insertion of the grab arm into a gap between a wall and a stack of drums or between two stacks of drums that have no clearance between rolling hoops or withdrawal of the arms from such gaps and (2) providing added security in supporting the load in that the rolling hoops or other convexly curved parts or other protuberances on the clamped object can project outwardly into the slot to receive vertical support. The vertical extent of the slot 38 should not, however, be made greater than necessary to achieve these purposes because the flexible grab arms according to the invention are made thin and should be of sufficient vertical extent to perform their function without buckling or permanent deformation. In general, it is preferred that the height of the slot be only a minor part of the height of the grab arm, advantageously not greater than the height of either the part of the arm above the slot or the part of the arm below the slot; when the height of the arm is not uniform, the above preferred relation applied to the midpoint of the slot.

The contiguous plates 35 and 36 of each arm are held in prestressed condition to maintain residual stresses therein by suitable fastening means, such as continuous or intermittent welds along the margins or distributed over the area of the plate, rivets, or the like, situated at a plurality of points at different distances from the rear of the arm so that the parts at said different points are restrained against longitudinal sliding movement. These fastening means are applied at a smaller number of points in relation to the area of the plate at the front than at the rear, so as to afford greater lateral flexibility at the front and greater stiffness at the rear. This pre-stressing is effected by applying a temporary load that bends the leaves elastically in a direction opposite to that in which they are deflected by clamping a load and holding the temporary load while applying the fastening means; preferably, the fastening means may be applied to the rear parts of the leaves prior to the application of the temporary load. Further, the arms are pre-set to produce toe-in.

Figure 6:
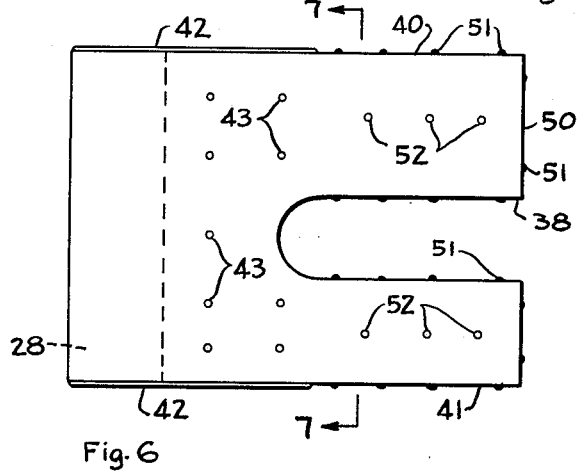
Figure 6 is a side elevation view of the grab arm.
Figure 7:
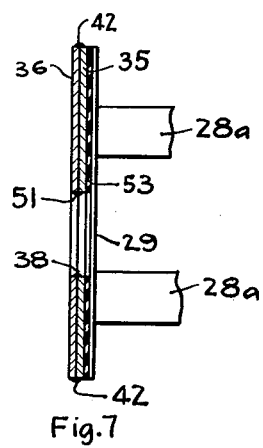
Figure 7 is a vertical section view taken on line 7—7 of Figure 6.

The above-mentioned construction, which is best understood by reference to Figures 5-7, may be effected as follows: the inner lamination 35 of each arm, initially a flat plate, is first rigidly fastened to the end of its respective clamp bracket, e. g., by welding as shown at 39 resulting in two substantially parallel plates or plates that converge slightly toward the front. The outer lamination 36, also initially a flat plate, is then placed into position against the inner lamination and welded either continuously or by close stitch welds along the rear parts of the upper and lower edges 40 and 41 to produce welds indicated at 42. Plug welds between these parts of the edges, as shown at 43, are optionally applied over the rear part of the plate area, either at this time or when the welds 52, described below, are applied. The rear welds 42 and 43 are advantageously carried forward as far forward as the point at which the convergence begins, e. g., to the dotted line 44. The location of this line marking the beginning of the convergence will vary for different load dimensions; it is usually spaced forwardly from the supported parts of the arms (i. e., from the front of the bracket 28 or 29) by a distance from one-eighth to one-half of the diameter of the primary convexly shaped load, such as a drum, to be clamped. Thus, in the case illustrated in Figures 1-7, wherein the clamp is intended to handle a single drum, the line 44 is located one-half drum diameter forward; when two drums are to be clamped in side-by-side relation (with each drum engaging only one of the arms) the line is advantageously located about one-fourth of the drum diameter D forward, as illustrated in Figure 8; and when four drums, arranged in a rectangle are to be clamped, the line is advantageously located one-eighth of the diameter D forward, as illustrated in Figure 9. With regard to the latter figure it may be stated that the curvature does not appear in the drawing to start at the line 44 because the arms are deflected by engagement with the drums.

Both arms having been assembled as described above, the temporary load is applied. In this operation the forward parts of the plates are bent inwardly elastically accomplishing the pre-setting and pre-stressing condition having elastic characteristics. They are held in converged position by a suitable jig, represented diagrammatically by a pair of temporary tension clamps 46 connected by rods 47 connected by a threaded sleeve 48 containing right-hand and left-hand threads and which may be used to draw the plates together, it being understood that a plurality of such rod and clamp assemblies at different levels would be used. A possible technique for bending the front ends is to bend the inner plates first and then to bend the outer plates over the inner plates. When the front ends of the plate are drawn together most of the bending takes place in the forward, unwelded parts thereof. An alternate method includes the use of a temporary, vertically elongated strut 49 which may be placed against the inner plates 35 along vertical lines situated at about the place at which convergence is to begin, indicated by the dotted line 44, to keep these parts of the plates spaced apart while the front ends are drawn together. When the plates are thus secured, the front, curved parts of the plates to the front of the previous welds, are connected to prevent relative longitudinal shifting, preferably by tack welding along the margins after grinding them to shape. The welding of the curved parts is preferably effected by tack welding at intervals along the forward parts of the upper and lower edges 40 and 41, the front edges 50, and the edges of the slot 38 as indicated at 51. Additional plug welds 52 may be applied over the front parts of the areas of the plates when greater stiffness is required. When the clamps are removed to relieve the temporary loading the arms straighten slightly from the shapes indicated in Figure 4 but retain some of the curvature. The welded arms may then be heat treated, for example, by placing the structure after removal of the clamps into a furnace and subjecting it to a low temperature of about 1100° F., to effect stress relief. This heat treatment should not be severe enough to relieve the plates 35 and 36 from the compressive and bending stresses mentioned above, but only sufficient to relieve local stresses caused by the welding.

Following the above treatment the arms will have shapes with the forward parts curved in slightly, as shown in Figure 2. The front parts are more flexible than the rear parts. The front face of the bracket 30 and the exposed faces of the inner laminations 35 are preferably covered with a suitable resilient material 53 having a high coefficient of friction, such as rubber facing, expanded metal, mesh, or a combination of these or similar materials.

It is evident that when the clamp is not engaging a load at least the front parts of the individual laminations of the completed arm are subjected to two residual stresses: they are subjected to bending stresses urging the front ends toward each other, all laminations of the same arm being stressed in the same sense or direction; and, the inner lamination 35 is under longitudinal tension while the outer lamination 36 is under longitudinal compression. Stated in another way, the similar bending stresses may be described as acting in longitudinal planes passing through the several laminations of the arm (or as acting about axes parallel to the load-engaging face and transverse to the length of the arm) and urging the front parts of the laminations toward the load-engaging face of the arm. Toe-in is, in this embodiment, provided only to the front of the dotted line 44; however, the rear parts may be made to converge slightly toward the front.

Although in the foregoing description the fabrication of the grab arms involved simultaneous work on two arms of a complete clamp, it is evident that this is not essential but was described to facilitate the disclosure and that the method of making the arms may be practiced by working on one arm at a time, using other clamping devices, and that the arms may be fabricated prior to attachment to the clamp brackets.

When using the truck for lifting objects with rounded outlines, such as an oil drum 54 standing on end and having peripheral rolling hoops 55, (Figures 1 and 2) the clamp brackets are moved apart and the truck 20 is maneuvered into position to embrace the drum, the elevator being previously moved if necessary to position the slot 38 at the level of one of the rolling hoops. When the clamp brackets are brought together, the rolling hoop opposite the slot 38—the lower hoop in the case illustrated—projects through the said slot and the other rolling hoop extends laterally outwards from the grab arms over the upper or lower edges—the upper edges in the case illustrated. Each of the parts of the grab arm above and below the slot applies a clamping force to the drum at the smooth, cylindrical portions thereof. The front parts of the arms remain toed-in and the drum is secured against forward slippage despite deflection of the rear parts of the arms due to the application of a strong clamping force by the clamp brackets or the sudden stopping of the truck 20 when in forward motion. In fact, the clamp can securely clamp two upright drums disposed side by side, with one drum in engagement with only the arm 33 and the other drum in engagement with only the arm 34, as shown in Fig. 8. The convergence of the flexible, front parts of the arms again prevents forward slippage. With longer arms a greater number of upright drums, arranged in two rows parallel to the arms, can be clamped, as shown in Figure 9.

When used to clamp flat-ended objects, such as a carton or box 56 (Figure 4) or a cylindrical drum with the parallel ends in engagement with the grab arms, the truck is similarly maneuvered to embrace the box or similar object. When the clamp brackets are moved together the box is engaged first at the front parts of the grab arms. These parts are sufficiently flexible to straighten elastically, thereby engaging the ends of the box resiliently along the length of the arms, and affording a dependable clamping action despite the outward bending deflection of the rear parts of the arms, where the bending moment is greatest. The arms, accordingly, assume the shapes shown in Figure 4 and a substantially even pressure is applied against the box. Moreover, the flexibility of the arms also permits the arms to adapt themselves to boxes the ends of which are not truly parallel and makes it possible to clamp securely a plurality of boxes situated not only across the breadth of the clamp but also at various points along the lengths of the arms. The flexibility further facilitates clamping boxes of light construction with reduced danger of crushing them.

When the arms are loaded by clamping a load, a slight buckling or separation of the laminations at the parts between the welds can be discerned. The flexibility can be made greater or smaller by applying fewer or greater, respectively, welds.

An important advantage of the construction is that it permits the grab arms to be made relatively thin and with outer and inner surfaces that are free from protuberances, whereby the arms can be inserted into narrow gaps or withdrawn therefrom.

Several variants that may be employed individually or in combination are illustrated in the embodiment according to Figures 10–13. The clamp comprises a pair of grab arms 60 and 61, rigidly secured to laterally translatable clamp brackets 62 and 63, respectively, which may be constructed and mounted similarly to the brackets 28 and 29, except that the sides thereof are not parallel but converge toward the bottom and toward the front, best seen in Figures 12 and 13, respectively. The former convergence imposes a camber to the grab arms, whereby the intersections of the arms with a transverse vertical plane are downwardly convergent. These convergences are made small, particularly when the clamp is to be used also for handling objects with flat, parallel ends; convergences of from about 1° to 6° are normal.

Each grab arm is built up of two contiguous spring steel laminations 64, 65, that have the front parts thereof initially curved outwardly at a radius of curvature that preferably increases progressively to the front when in their natural unstressed conditions, the curvature being exaggerated in Figure 10 which shows the laminations for the right arm 60. The laminations are attached to the clamp brackets in the manner described above, but are pre-set to converge from the clamp brackets by virtue of the forward convergence of the sides of the brackets. The laminations are then pre-stressed and secured against relative longitudinal movement in the manner previously described, e. g., by first applying a continuous weld 42 at the rear parts of the upper and lower margins, applying a temporary load to deflect the front parts inwardly, applying marginal stitch welds 51 at the front parts and releasing the temporary load; plug welds 43 and 52 distributed over the areas of the laminations may be applied if necessary. The pre-stressing operation in this embodiment differs from that previously described in that the laminations are bent elastically inwardly only to that small degree of inward curvature to result in arms that are substantially straight when the final welding operation is completed and the temporary load is removed. The finished arms, therefore, are substantially flat and forwardly convergent. The upper edge 66 may be inclined downwardly toward the front. A longitudinal slot 67 is cut from the front through both laminations. (This slot is omitted from Fig. 13 for clarity.) The slot 67 corresponds to and serves the functions previously described for the slot 38 but is here made longer to extend for a slightly more than three-fourths of the length of the arm; this permits two upright drums to engage the same arm and have one rolling hoop of each drum project through the slot when used as suggested in Figure 9. The vertical extent of the slot must again be kept within bounds, as noted above, so as not to weaken the arms, and a relatively thin slot as shown is preferred, particularly when the arms are made long. The edges of the slot may be beveled, as shown at 68, to conform approximately to the outline of a drum or keg, whereby better adapting the clamp to picking up such objects when their axis is parallel to the clamp axis without damage to the object. The grab arms may, if desired, be covered with resilient material (not shown) having a high coefficient of friction, as previously described.

The clamp may be used, for example, as shown in Figures 11 and 12, wherein 69–72 are four touching drums resting on the ground and 73 is a drum resting on drums 70 and 71. To pick up the center three drums the lift truck is maneuvered to a location opposite the ends of these drums with the grab arms opposite the appropriate intervals, the elevator being operated to bring the slots 67 to the level of the points of contact between the drums 69 and 70 and between the drums 71 and 72. The clamp is then inserted into the gaps between the drums above and below the points of contact. When the clamp is close the drums 70 and 71 are clamped together, the forward ends of the arms becoming flexed outwardly, e. g., until they both approach or attain positions perpendicular to a transverse vertical plane, i. e., they lose much of their apparent convergence. They may also lose some or most of the camber. The rolling hoops project outward through the slots 67. These slots and the camber jointly contribute to the stability of the clamping action.

It is evident that changes in the details and dimensions may be made without departing from the spirit of the invention as defined in the appended claims.

An example of a clamp with grab arms formed of single plates is disclosed in co-pending application Serial No. 328,303, filed concurrently herewith, wherein the feature of providing camber (shown in Figures 11–13) is claimed.

I claim as my invention:

1. A grab arm construction for a clamp having a load-engaging face and which clamp is attached to a shiftable clamp bracket comprising: a plurality of parallel, elongate members arranged as a stack that has the said members progressively farther away from the said load-engaging face of the arm, said members extending longitudinally forwardly from the bracket and being fixed thereto so as to transmit thereto bending stress due to forces applied against said load-engaging face of the arm, said stack including a member near said load-engaging face that is under longitudinal tensile stress and including further a member away from said face that is under longitudinal compressive stress when the said arm is unloaded; and fastening means on said arm situated at a plurality of points at different distances forwardly from the bracket for securing said members against relative longitudinal shifting to maintain said members under the said stresses.

2. A grab arm construction according to claim 1 wherein said members are parallel contiguous plates and the said fastening means are welds at least some of which are at the margins of the plates.

3. A grab arm construction for a clamp having a load-engaging face and which clamp is attached to a shiftable clamp bracket comprising: a plurality of parallel, elongate members arranged as a stack that has the said members progressively farther away from the said load-engaging face of the arms, said members extending longitudinally forwardly from the bracket and being fixed thereto so as to transmit thereto bending stress about an axis transverse to the longitudinal direction of the arm and parallel to said load-engaging face due to forces applied against said load-engaging face of the arm, each of said members being under residual bending stress acting about said transverse axis in a direction opposite to the said transmitted bending stress face when said arm is unloaded; and fastening means on said arm situated at a plurality of points at different distances forwardly from the bracket for securing said members against relative longitudinal shifting to maintain the said members under the said residual bending stresses.

4. A grab arm construction according to claim 3 wherein said members are parallel contiguous plates and the front parts thereof are curved elastically toward said load-engaging face when the arm is unloaded, said front part being more flexible than the rear parts thereof to be elastically deflected to flatten the arm upon engagement with a flat object.

5. A grab arm construction according to claim 3 wherein only the front parts of said members are under the said residual bending stress and the rear parts thereof are substantially free from stresses when the arm is unloaded.

6. In a clamp adapted to handle flat-ended objects and convexly curved objects, the combination of a support structure, a pair of laterally shiftable clamp brackets mounted on said support structure for relative translatory motion, means for translating said brackets relatively to each other, and a grab arm extending longitudinally forwardly from each of said brackets and rigidly attached thereto for transmitting lateral and vertical cantilever stresses, each arm comprising a plurality of parallel, substantially vertical plates including an outer plate and an inner plate, at least the front parts of the arms being converged, each of the said plates of at least one arm being bent elastically inwardly toward the other arm from their natural shapes, at least at said front parts thereof when the arm is unloaded, thereby being under residual bending stress acting inwardly in horizontal planes, and the outer plate of said one arm being under longitudinal residual compressive stress and the inner plate of said arm being under longitudinal residual tensile stress when the arm is unloaded, and a plurality of connections on said arm situated at different distances forwardly from the brackets and fixing the plates of the arm against relative longitudinal shifting to maintain said plates under the said residual stresses.

7. A clamp according to claim 6 wherein only the front parts of said plates are under said residual bending stress and the rear parts thereof are substantially free from bending stress when the arm is unloaded.

8. A clamp according to claim 6 wherein the said connections include welds, the welds being more closely spaced at the rear part of the arm than at the front part, whereby said front part is laterally more flexible than the rear part.

9. A clamp according to claim 6 wherein said connections include continuous marginal welds in the rear parts of the plates and tack welds at intervals along the margins of the front parts of the plates.

10. A clamp according to claim 6 wherein said connections include plug welds distributed over the area of the plates.

11. In a clamp adapted to handle flat-ended objects and convexly curved objects, the combination of a support structure, a pair of laterally shiftable clamp brackets mounted on said support structure for relative translatory motion, means for translating said brackets relatively to each other, and a grab arm extending longitudinally forwardly from each of said brackets and rigidly attached thereto for transmitting lateral and vertical cantilever stresses, each arm comprising a plurality of parallel, substantially vertical plates including an outer plate and an inner plate, the rear parts of said arms being spaced apart a substantially constant distance and the front parts of the arms being curved toward each other, each of the said plates being bent elastically inwardly toward the other arm from their natural shapes at least at said front parts thereof when the arms are unloaded, thereby being under residual bending stress acting inwardly in horizontal planes, and the outer plate of each arm being under residual longitudinal compressive stress and the inner plate of each arm being under residual longitudinal tensile stress when the arm is unloaded, and a plurality of connections on each arm situated at different distances forwardly from the brackets and fixing the plates of the arms against relative longitudinal shifting to maintain said plates under the said residual stress.

12. A clamp adapted to handle flat-ended objects and convexly curved objects comprising: a support structure, a pair of clamp brackets on said support structure for relative translatory motion, and a pair of thin substantially vertical grab arm, each of said arms extending longitudinally forwardly from a single bracket, and rigidly fixed thereto for transmitting lateral and vertical cantilever stresses, at least the front parts of said arms being converged and the front part of at least one arm being laterally more flexible than the rear part of the same arm.

13. A clamp according to claim 12 wherein said arms have longitudinal slots open at the front, for receiving laterally protruding parts of objects to be clamped, said slots extending back from the front for at least half of the length of the arms.

14. A clamp adapted to handle flat-end and convexly curved objects comprising: a support structure, a pair of clamp brackets on said support structure for relative lateral translatory motion, means for translating said brackets relative to each other, and a pair of grab arms, each of said arms extending longitudinally forwardly from a single bracket, and being rigidly fixed thereto for transmitting lateral and vertical cantilever stresses, each arm comprising a plurality of substantially vertical parallel plates arranged as a transverse stack; and fastening means on each of said arms situated at a plurality of points at different distances forwardly from the brackets for securing the plates of the same arm against relative longitudinal shifting, at least the front parts of the arms away from the brackets, being converged gradually toward each other and being flexible to flex outwardly into substantially parallel relation when brought into engagement with a flat-ended object.

15. A clamp according to claim 14 wherein the rear parts of the arms immediately adjacent the brackets are spaced apart a substantially constant distance out to the inwardly curved front parts.

16. A clamp adapted to handle flat-ended and convexly curved objects comprising: a support structure, a pair of clamp brackets mounted on said support structure for relative lateral translatory motion, means for translating said brackets relatively to each other and a pair of grab arms, each of said arms extending longitudinally forwardly from a single bracket, and being rigidly fixed thereto for transmitting lateral and longitudinal cantilever stresses, each arm comprising a plurality of substantially vertical, parallel plates arranged as a transverse stack; fastening means on each arm situated at a plurality of points at different distances forwardly from the brackets for securing the plates of the same arm against relative longitudinal shifting, at least the front parts of said arms, away from the brackets, being converged toward the front and said converged parts being flexible to flex outwardly into substantially parallel relation when brought into engagement with a flat-ended object; and a longitudinal slot, open at the front, for receiving laterally protruding parts of objects to be clamped.

17. A clamp comprising a support structure, a pair of clamp brackets mounted on said support structure for relative translatory motion, means for translating said brackets relatively to each other, and a pair of substantially vertical grab arms, each of said arms extending longitudinally forwardly from a single bracket and fixed thereto for transmitting lateral and longitudinal cantilever stresses, at least the front parts of said arms being thin and substantially flat so as to enter the interval between cylindrical drums having rolling hoops and standing on end with the hoops of adjacent drums in contact, each said arm including an upper part and a lower part spaced apart vertically to provide an intervening longitudinal slot which is open to the front for receiving a rolling hoop of a drum, whereby said upper and lower parts of the arms can clamp the portions of the drum situated respectively above and below said rolling hoop.

18. A clamp according to claim 17 wherein said arms have flexibilities such that the front parts thereof are converged when a drum is supportedly clamped at intermediate parts of the arms.

19. A clamp comprising: a support structure, a pair of clamp brackets mounted on said support structure for relative translatory motion, means for translating said brackets relatively to each other, and a pair of substantially vertical grab arms, each of said arms extending longitudinally forwardly from a single bracket and fixed thereto for transmitting lateral and longitudinal cantilever stresses, said arms having substantially flat faces directed toward each other and at least the front parts of said arms being thin and converged, the thickness of said front parts and the convergence being sufficiently small to permit entry of the arms into close spaces between cylindrical drums having rolling hoops and standing on end with the hoops of adjacent drums in contact by a forward movement of the arms until the widest part of a drum between the arms is opposite longitudinally intermediate parts of the arms, said arms being laterally flexible and having sufficient lateral stiffness to be converged forwardly of the widest part of the drum when supportingly clamping said drum at said longitudinally intermediate parts of the arms.

20. A clamp according to claim 19 wherein said arms are sufficiently flexible to cause said faces to assume substantially flat barrel positions when clamped to a flat-ended object.

21. A clamp adapted to handle flat-ended objects and convexly curved objects comprising a support structure, a pair of clamp brackets on said support structure for relative translatory motion, means for translating said brackets relatively to each other, and a pair of thin substantially vertical grab arms, each of said arms being fixed to a single bracket for transmitting lateral and longitudinal cantilever stresses, said arms having substantially flat faces directed toward each other and at least the front parts thereof being converged, the thickness and the convergence being sufficiently small to permit entry of the arms into the interval between cylindrical drums having rolling hoops and standing on end with the hoops of adjacent drums in contact by a forward movement of the arms until the widest part of a drum between the arms is opposite longitudinally intermediate parts of the arms, each said arm including an upper part and a lower part spaced apart vertically to provide an intervening longitudinal slot which is open to the front for receiving a rolling hoop of a drum, whereby said upper and lower parts of the arms can clamp the portions of the drum situated respectively above and below said rolling hoop, said arms having lateral flexibility such as to engage the ends of flat-ended objects continuously over extended areas and to be converged forwardly of the widest part of the drum when supportingly clamping said drum at the said longitudinal parts of the arms.

References Cited in the file of this patent

UNITED STATES PATENTS

| | | |
|---|---|---|
| 1,770,932 | Leake | July 22, 1930 |
| 1,770,933 | Leake | July 22, 1930 |
| 1,929,447 | Remde | Oct. 10, 1933 |
| 2,039,398 | Dye | May 5, 1936 |
| 2,364,494 | Upson | Dec. 5, 1944 |
| 2,367,552 | Ahrndt | Jan. 16, 1945 |
| 2,370,528 | Fontaine | Feb. 27, 1945 |
| 2,415,240 | Fouhy | Feb. 4, 1947 |
| 2,561,896 | Weiss | July 24, 1951 |
| 2,620,552 | Jenkins | Dec. 9, 1952 |